(12) United States Patent
Thomas (10) Patent No.: US 9,385,518 B2
(45) Date of Patent: Jul. 5, 2016

(54) LAYING NETWORK CABLES IN SEWERS

(75) Inventor: Elfed Thomas, Llandudno (GB)

(73) Assignee: FIBRE OPTIC SOLUTIONS LIMITED, Oswestry Shropshire (GB)

( * ) Notice: Subject to any disclaimer, the term of this patent is extended or adjusted under 35 U.S.C. 154(b) by 1045 days.

(21) Appl. No.: 13/058,814

(22) PCT Filed: Aug. 12, 2009

(86) PCT No.: PCT/GB2009/001981
§ 371 (c)(1),
(2), (4) Date: Sep. 7, 2011

(87) PCT Pub. No.: WO2010/018376
PCT Pub. Date: Feb. 18, 2010

(65) Prior Publication Data
US 2011/0309314 A1 Dec. 22, 2011

(30) Foreign Application Priority Data
Aug. 12, 2008 (GB) .................................. 0814665.6

(51) Int. Cl.
| H02G 1/08 | (2006.01) |
| H02G 9/06 | (2006.01) |
| G02B 6/44 | (2006.01) |
| G02B 6/50 | (2006.01) |

(52) U.S. Cl.
CPC ............... *H02G 9/06* (2013.01); *G02B 6/4459* (2013.01); *G02B 6/508* (2013.01); *H02G 1/08* (2013.01)

(58) Field of Classification Search
USPC .......... 29/271, 281.1; 254/134.3 FT, 134.3 R, 254/134.4
See application file for complete search history.

(56) References Cited

U.S. PATENT DOCUMENTS 6,571,833 B1 * 6/2003 McLarty et al. ............... 138/116
2004/0146362 A1 * 7/2004 Penza ........................ 405/184.4

FOREIGN PATENT DOCUMENTS

| JP | 2203302 A | 8/1990 |
| WO | 2008009964 A2 | 1/2008 |
| WO | 2008009969 A2 | 1/2008 |

* cited by examiner

*Primary Examiner* — Monica Carter
*Assistant Examiner* — Nirvana Deonauth
(74) *Attorney, Agent, or Firm* — Barlow, Josephs & Holmes, Ltd.

(57) ABSTRACT

A cable guide includes an upper face and a lower face. The lower face has a generally convex form so as to lie in contact with the flow channel when fitted in the flow channel. The upper face has a generally concave form and is shaped to minimize disturbance of the flow when fitted in the flow channel. A passage is defined between the lower face and the flow channel having an entrance opening at a first end of the cable guide and exit openings on the sides of the cable guide towards a second end. By utilizing a cable guide, disruption to the flow within the channel by the entrance or exit of the cable is minimized.

29 Claims, 10 Drawing Sheets

LAYING NETWORK CABLES IN SEWERS

The present invention relates to the laying of cables in sewers, and in particular to a means for enabling such cables to be laid along the flow channel at the bottom of a sewer.

In order to install a new hardwired network and minimise disruption caused by the laying of new cables, some network installers have taken to laying cables within sewer pipes rather than constructing dedicated conduits.

When laying cables within a sewer, the cheapest and simplest solution is to lay the cables along the flow channel at the bottom of the sewer. A cable lying parallel to the direction of flow in the flow channel has a minor to negligible effect on the flow rate and a similarly minor likelihood of snagging debris and thus blocking of the flow channel. At some point however, the cable must enter/exit the flow channel. At such points, the cable lies across the direction of flow and thus creates a significant barrier to flow and a greatly increased chance of causing a blockage. Accordingly, our prior application WO2008/009964 discloses the use of a dedicated cable guide to enable a network cable to enter/exit the flow channel with minimal impedance to the flow. Such a cable guide reduces but does not entirely eliminate the blockage potential in the flow channel of a sewer. There is thus a desire for a cable guide having a further reduced blockage potential. There is also a desire for a cable guide that may be installed even more quickly and easily. A further problem is that cable guides of the type disclosed in WO2008/009964 have a particular orientation and thus if cables are desired to exit a flow channel in different directions at different locations, either a stock of two different orientations of cable guide must be provide or the cable must be pinned over the whole roof of the sewer to reach the desired entry/exit point.

It is therefore an object of the present invention to provide an improved cable guide which at least partly alleviates or overcomes the above issues.

According to a first aspect of the present invention there is provided a cable guide, suitable for use in the flow channel of a sewer without substantially impeding the flow, the cable guide comprising: an upper face that provides a boundary to the flow channel and is shaped and/or otherwise adapted to minimise disturbance of the flow; and a lower face adapted to lie in contact with the walls of the flow channel section wherein the lower face is provided with one or more substantially contiguous recesses which when the lower face lies in contact with the walls of the flow channel define one or more passageways suitable for carrying a cable from one edge of the cable guide to another.

The passageway defined by the cable guide above thus provides a means by which a cable can traverse from one edge of the cable guide to another within the flow channel with minimal disturbance to the flow.

The cable guide may be formed from Polyvinyl Chloride, Polypropylene, Glass Reinforced Plastic, stainless steel or any other material suitable for resisting decomposition by chemical or biological agents likely to be present within the sewer effluents such as oils, acids and other substances.

The lower face may be adapted to lie in contact with any wall of the flow channel including but not limited to: one side of the flow channel; one side of the flow channel and at least part of the base of the flow channel; or both sides of the flow channel and the base of the flow channel. In order that the lower face may lie substantially flush with the walls of the flow channel, it is preferably shaped to correspond with the walls of the flow channel. In some embodiments, the lower face may be shaped so as to lie within a recess provided in the walls of the flow channel.

The contact between the lower face and the walls of the flow channel may be by way of substantially the full surface of the lower face, excluding said recesses. Alternatively, in at least some areas contact may be between one or more vanes projecting from the surface of the lower face. Such vanes may provide compensation for surface unevenness.

The recesses may provide a passageway leading from one edge of the cable guide lying towards the middle of the flow channel to an edge of the cable guide at the edge of or outside the flow channel. The passage may thus provide a means by which a cable can traverse the flow channel with minimal disturbance to the flow. In some embodiments, the recesses may be adapted such to provide a single entrance point at an edge of the cable guide lying towards the middle of the flow channel and two alternative exit points on opposite side edges of the cable guide at the edge of or outside the flow channel. This can allow a single form of cable guide to be used to allow a cable to enter/exit a flow channel in either direction.

In a further embodiment, the recesses may be adapted such to provide a single entrance point at an edge of the cable guide lying towards the middle of the flow channel and a single exit point at an opposite edge of the cable guide lying towards the middle of the flow channel. In this manner, the passage may thus provide a means by which a cable can be secured within the flow channel with minimal disturbance to the flow.

In a further embodiment, the recesses may be adapted such to provide an entrance/exit point at a each edge of the cable guide lying towards the middle of the flow channel and two pairs of alternative exit/entrance points on opposite side edges of the cable guide at the edge of or outside the flow channel. In this manner, the passage may thus provide a means by which a cable can be secured within the flow channel with minimal disturbance to the flow or allow a cable to enter/exit a flow channel in either direction or allow a cable to traverse a flow channel.

In order to accommodate the recesses in the lower face, corresponding bulges may be provided in the upper face. The bulges are preferably shaped and/or otherwise adapted to minimise disturbance of the flow.

The cable guide may be retained in position by use of a suitable adhesive, such as an epoxy resin or similar. Preferably, the adhesive is adapted to cure within a time period of say, 1 hour or less. Most preferably, the adhesive is adapted to cure within a time period of say, 15 minutes or less. Advantageously, the adhesive is adapted to cure in the presence of water. Alternatively, the cable guide may be secured in position by means of suitable fixing means. The suitable fixing means may comprise bolts, screws, nails or similar driven into the wall of the flow channel through fixing holes provided in the cable guide. Receiving holes may be provided in the walls for receiving the fixing means. Bulges may be provided around the fixing holes. The bulges may be shaped and/or otherwise adapted to minimise disturbance of the flow.

In some embodiments, the cable may be adapted to lie at least partly in a pre-existing or specifically prepared groove in the sewer. In such embodiments, the cable may be retained in the groove by adhesive or any other suitable means. Preferably, in such embodiments, the cable guide extends over the groove, such that a smooth flow may be achieved. If necessary, a suitable filler material may be used to fill and/or smooth over the groove.

In one preferred embodiment, the cable guide comprises a panel shaped to conform to the profile of the flow channel section in which the guide is provided. In many embodiments, the cable guide is to be provided in the main flow channel. In such embodiments, the lower face may have an overall form that is substantially convex and an upper face with an overall form that is substantially concave. In alternative embodiments, the cable guide may be adapted to be provided on the overflow portion of the flow channel. This may be required if the cable is required to exit the flow channel at a bend or junction. In such embodiments, the upper and lower faces may be of substantially flat overall form.

According to a second aspect of the present invention there is provided a network comprising: one or more cables laid along the flow channels of sewers; and one or more cable guides according to the first aspect of the present invention.

The network of the second aspect of the present invention may incorporate any or all of the features described in relation to the cable guide of the first aspect of the invention as desired or as appropriate.

Preferably, the network may comprise a cable guide of an embodiment providing a single entrance point at an edge of the cable guide lying towards the middle of the flow channel and a single exit point at an opposite edge of the cable guide lying towards the middle of the flow channel at regular intervals along the cable lying in the flow channel.

Preferably, the network may comprise a cable guide of an embodiment providing at least a passageway leading from one edge of the cable guide lying towards the middle of the flow channel to an edge of the cable guide at the edge of or outside the flow channel at each point where a cable is required to enter/exit the flow channel of a sewer. The cable guides may be provided on either side of bends and/or junctions in the sewer and at places wherein the cable is to exit the sewer altogether. At such points the cable may be pinned to the walls or roof of the sewer once it exits the flow channel. Additionally or alternatively, at such points a cable may be secured by means of a cable guide of substantially flat overall form adapted to be provided on the overflow portion. Additionally or alternatively, the cable may be passed into a bypass tube or duct or into an exit duct once it exits the flow channel. Where the cable exits the sewer, the exit point of the cable from the sewer may be sealed around the cable to inhibit the escape of noxious or unpleasant gases.

The network can be used for any data. The cables within the network may be adapted to carry electrical or optical data signals and may thus be electrical data cables or fibre optic cables as required.

According to a third aspect of the present invention there is provided a method of laying a cable network incorporating at least one cable lying in the flow channel of a sewer comprising the steps of: laying a cable in the flow channel of a sewer; installing a cable guide according to the first aspect of the present invention at points wherein the cable is required to be secured and/or where the cable is required to enter/exit the flow channel; and passing the cable through the cable guide.

The method of the third aspect of the present invention may incorporate any or all of the features described in relation to the cable guide of the first aspect of the invention or the network of the second aspect of the present invention as desired or as appropriate.

The method may further involve providing cable guides of the type comprising a single entrance point at an edge of the cable guide lying towards the middle of the flow channel and a single exit point at an opposite edge of the cable guide lying towards the middle of the flow channel at regular intervals along the cable lying in the flow channel.

The method may involve providing for the cable to leave the flow channel on either side of bends and/or junctions in the sewer and at places wherein the cable is to exit the sewer altogether. At such points the method may involve pinning the cable to the walls or roof of the sewer once it exits the flow channel. Additionally or alternatively, it may involve providing a cable guide of substantially flat overall form adapted to be provided on the overflow portion. Additionally or alternatively, the method may involve passing the cable into a bypass tube or duct or into an exit duct once it exits the flow channel. Where the cable exits the sewer, the method may involve sealing the exit point of the cable from the sewer around the cable to inhibit the escape of noxious or unpleasant gases.

According to fourth aspect of the present invention there is provided a method of installing a cable guide in accordance with the first aspect of the present invention in a sewer comprising the steps of: applying adhesive to the cable guide; and positioning the cable guide at a desired location in the sewer.

The method of the fourth aspect of the present invention may incorporate any or all of the features described in relation to the cable guide of the first aspect of the invention, the network of the second aspect of the present invention or the method of the third aspect of the present invention as desired or as appropriate.

The cable guide may be fitted in the flow channel of a sewer or may be fitted on the overflow portion as is desired or appropriate bearing in mind the form of the cable guide and the desired cable path.

The method may include the further steps of providing a series of receiving holes in the sewer at the desired location; securing the cable guide by means of fixing means driven into the receiving holes through fixing holes provided in the cable guide. The receiving holes may be provided before or after positioning the cable guide in the sewer.

According to a fifth aspect of the present invention there is provided a method of installing a cable guide in accordance with the first aspect of the present invention in a sewer comprising the steps of: positioning the cable guide at a desired location in the sewer; providing a series of receiving holes in the sewer at the desired location; securing the cable guide by means of fixing means driven into the receiving holes through fixing holes provided in the cable guide.

The method of the fifth aspect of the present invention may incorporate any or all of the features described in relation to the cable guide of the first aspect of the invention, the network of the second aspect of the present invention or the method of the third aspect of the present invention as desired or as appropriate.

The cable guide may be fitted in the flow channel of a sewer or may be fitted on the overflow portion as is desired or appropriate bearing in mind the form of the cable guide and the desired cable path.

The receiving holes may be provided before or after positioning the cable guide in the sewer.

In relation to some embodiments of the fourth or fifth aspects of the present invention, the method may incorporate the step of providing a groove for the cable. The groove may be formed by use of a disc cutter. This can enable the convenient formation of a groove of pre-determined width and depth. In such embodiments, the method may comprise the further step of applying filler material over the cable to fill the groove and provide a smooth surface.

Preferably, the filler material is of sufficient viscosity to substantially hold its shape whilst curing thus allowing the groove to be filled. Advantageously, the filler material is adapted to cure in the presence of water. The filler material may be an epoxy resin. If an epoxy resin adhesive is used to retain either the arm portion or the body portion in position, the filler material may be the same epoxy resin.

In order that the invention can be more clearly understood it is now described further below with reference to the accompanying drawings:

FIG. 2b shows an end view of the cable guide of FIG. 2a;

FIG. 2c shows a side view of the cable guide of FIG. 2a;

FIG. 2d shows an under view of the cable guide of FIG. 2a;

FIG. 4b shows an end view of the cable guide of FIG. 4a;

FIG. 4c shows a side view of the cable guide of FIG. 4a;

FIG. 4d shows an under view of the cable guide of FIG. 4a;

FIG. 6b shows an end view of the cable guide of FIG. 6a;

FIG. 6c shows a side view of the cable guide of FIG. 6a;

FIG. 6d shows an under view of the cable guide of FIG. 6a;

FIG. 8c shows a side view of the cable guide of FIG. 8a;

FIG. 8d shows an under view of the cable guide of FIG. 8a;

FIG. 10b shows an underneath plan view of the cable guide of FIG. 10a;

FIG. 11b shows a side view of the cable guide of FIG. 11a;

FIG. 11c shows an under view of the cable guide of FIG. 11a;

FIG. 12b shows a side view of the cable guide of FIG. 12a;

FIG. 12c shows an under view of the cable guide of FIG. 12a; and

FIG. 12d shows an end view of the cable guide of FIG. 12a.

Figure 1:
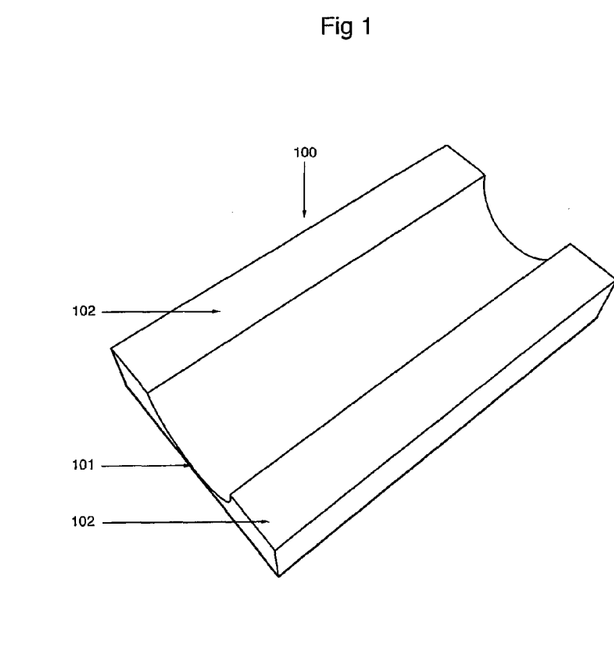
FIG. 1 is a schematic view of the base portion of a sewer incorporating a flow channel.

Referring now to FIG. 1, one form of sewer comprises a pipe having a bottom section 100 incorporating a flow channel 101 along which sewage flows. When there is a heavy flow load, the sewage can also flow over the banks (or overflow portion) 102 adjoining the flow channel 101.

Referring now to FIGS. 2a-2d, one embodiment of a cable guide 110 is shown. The cable guide 110 comprises an upper face 120 and a lower face 130. The lower face 130 has a generally convex form so as to lie in contact with the flow channel 101 when fitted in the flow channel 101. The upper face 120 has a generally concave form and is shaped to minimise disturbance of the flow when fitted in the flow channel 101.

A passage is defined between the lower face 130 and the flow channel having an entrance opening 113 at a first end 111 of the cable guide 110 and exit openings 114 on the sides of the cable guide towards a second end 112. The cable guide 110 is secured to the flow channel 101 by means of suitable fixing means (not shown) including but not limited to bolts, screws nails or similar passing through fixing holes 115. Additionally, a suitable adhesive may be applied to the lower surface 130 to increase the security of the fixing.

The cable guide 110 is formed from a rigid plastic material such as polyvinyl chloride, polypropylene or similar. Accordingly, the cable guide 110 is able to resist decomposition by chemical or biological agents likely to be present within the sewer. In alternative embodiments, the cable guide 110 may be formed from any other suitable material such as stainless steel.

Figure 2A:
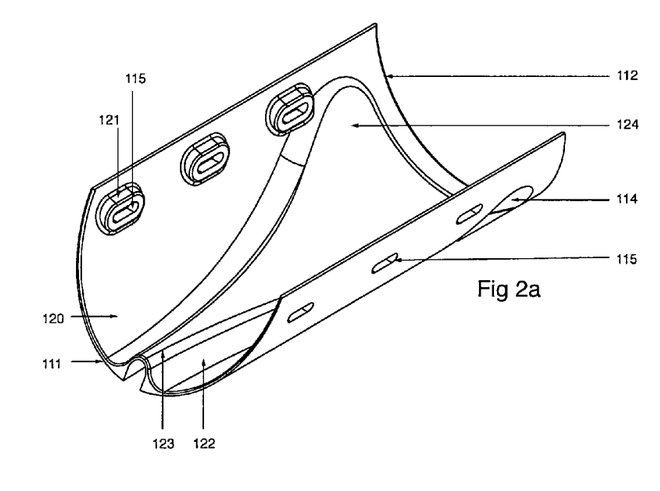
FIG. 2a shows a perspective view of one embodiment of a cable guide according to the present invention.
Figure 2B:
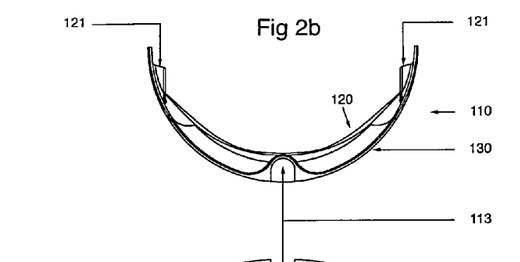
Figure 2C:
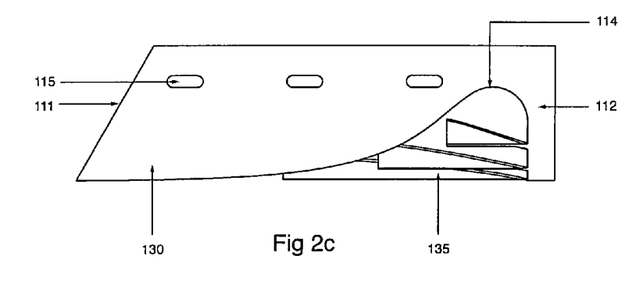
Figure 2D:
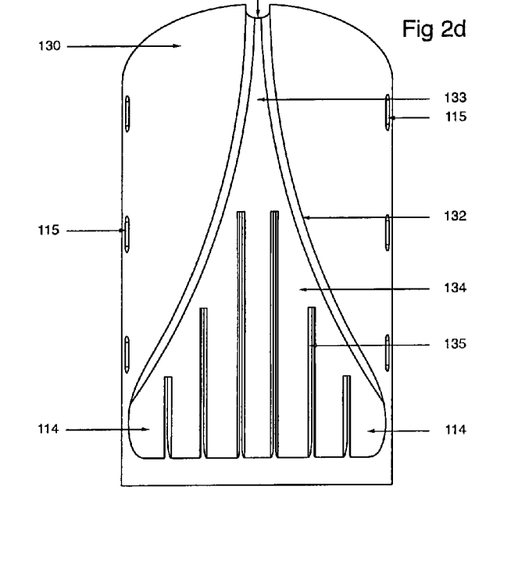

The lower surface 130 comprises a recess 132 having a narrow portion 133 culminating in opening 113 at first end 111. The recess has a wider portion 134 towards end 112, which at its widest points includes openings 114. The wider portion 134 is further subdivided by a plurality of vanes 135. These vanes help maintain the structural integrity of the recess 132 under vertical loading. A cable can thus be laid along the passageway from opening 111 to either opening 114.

The upper face 120 is provided with a bulge 122 corresponding to the recess 132. As with recess 132, the bulge 122 has a narrow portion 123 culminating in opening 113 at first end 111. The bulge similarly has a wider portion 124 towards end 112, which at its widest points includes openings 114. Providing two such openings 114 means one form of cable guide 110 can be used to allow a cable 105 to exit a flow channel 101 on either side, thus simplifying installation and stock management.

The bulge 122 has a curved surface shaped to minimise disturbance to the flow when fitted in the flow channel. Similarly, circumferential bulges 121 are provided around fixing holes 115 to minimise the disturbance to the flow provided by the heads of the fixing means.

Figure 3A:
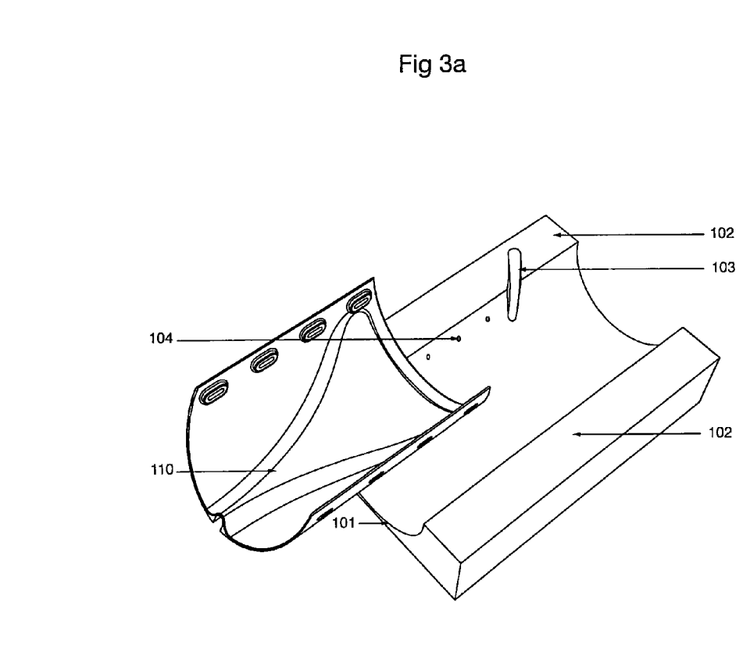
FIG. 3a shows an intermediate stage in installing a cable guide according to FIG. 2 in a flow channel of a sewer.
Figure 3B:
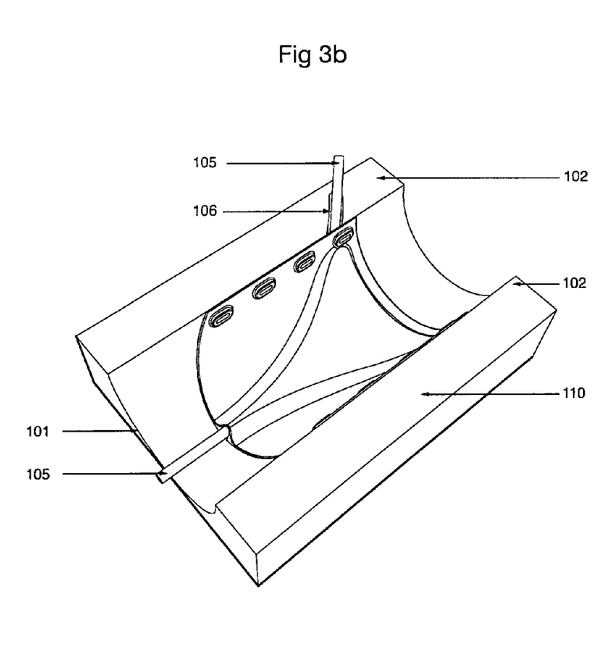
FIG. 3b shows a cable guide according to FIG. 2 installed in the flow channel of a sewer.

The cable guide 110 is installed into the sewer by the process illustrated in FIGS. 3a and 3b. Firstly, it is determined at what location the cable 105 is to enter/exit the flow channel 101. At this location a groove 103 is cut into the banks 102 and the side of the flow channel 101. The groove 103 is sufficiently wide and deep to accept the cable 105. Optionally, a series of receiving holes 104 for receiving fixing means are provided and/or epoxy resin of a type adapted to cure under water is applied to the lower face 130. The cable is then laid in the flow channel 101 exiting via groove 103. The cable guide 110 is then placed in the flow channel 101 such it covers the cable 105, the cable 105 running through the recess 132 from opening 113 to one of the openings 114 which has been aligned with groove 103. In an alternative method, the receiving holes 104 can be formed after the cable guide 110 is placed. Filler material 106, which may an epoxy resin such as that optionally used to secure the guide 110 in position, is then applied to smooth over the cable 105 in groove 103, so as to provide minimal impediment to flow along banks 102.

In an alternative embodiment, the cable guide 110 is installed in position relative to the groove 103 before a cable 105 can be passed through the passage between openings 113 and 114. The groove 103 is filled with suitable filler material 106 as before.

By utilising a cable guide in this way, disruption to the flow within the channel 101 by the entrance or exit of the cable 105 is minimised. Additionally, the guide 110 restricts the lateral movement of the cable 105 prior to entering opening 113, preventing the cable 105 lying across the direction of flow. In this manner, the cable guide 110 helps to reduce the disruption to the flow caused by the entrance/exit of the cable 105.

The cable guide 110 may be applied to the sewer in wet or dry conditions, as long as a suitable adhesive is used. As the installation process has few steps, it can be completed in under 1 hour. Accordingly, the use of such cable guides 110 along with the laying of the cable 105 loose in the flow channel 101 provides a relatively inexpensive and relatively quick method of laying cables through sewers. Accordingly, this cable guide and method may be applied to constructing networks, such as data networks, by laying cables through sewers. An additional advantage of using the cable guide according to the present invention is that if a network cable needs to be removed, the cable guide 110 can be left in place and does not provide a significant impediment to flow along the flow channel 101. Alternatively, if a cable 105 is to be replaced, it is quick and convenient to remove the old cable 105 and insert a replacement cable 105.

Figure 4A:
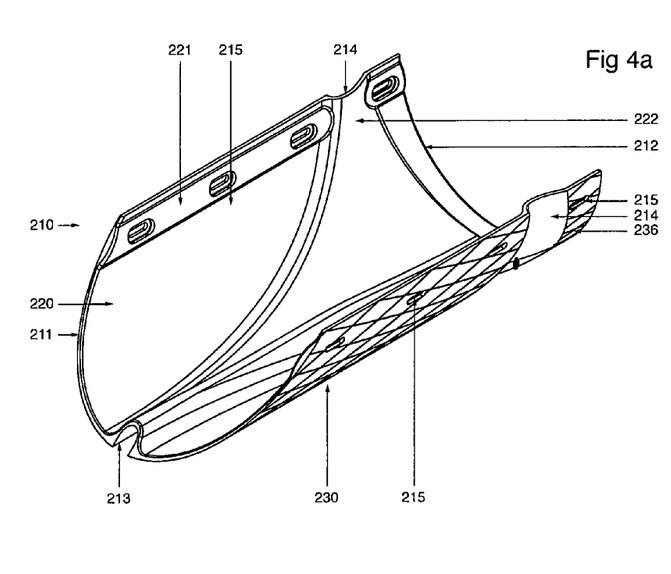
FIG. 4a shows a perspective view of a second embodiment of a cable guide according to the present invention.
Figure 4B:
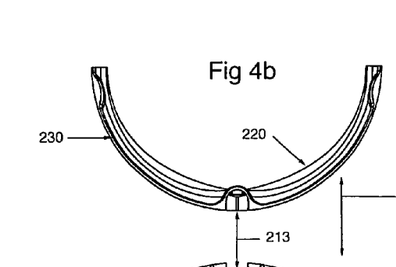
Figure 4C:
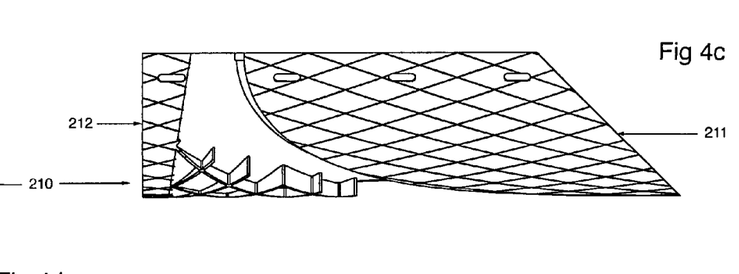
Figure 4D:
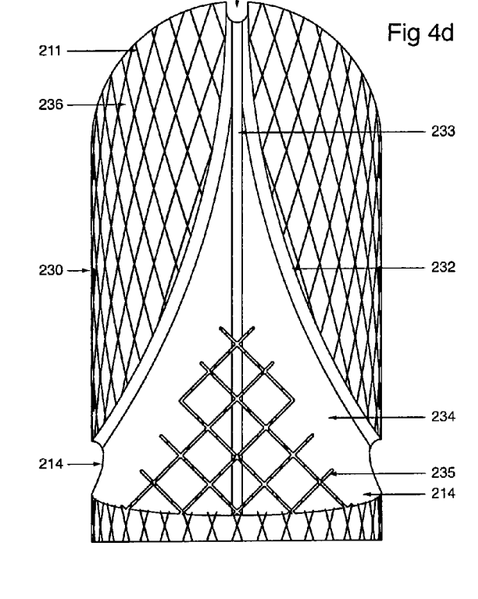
Figure 5:
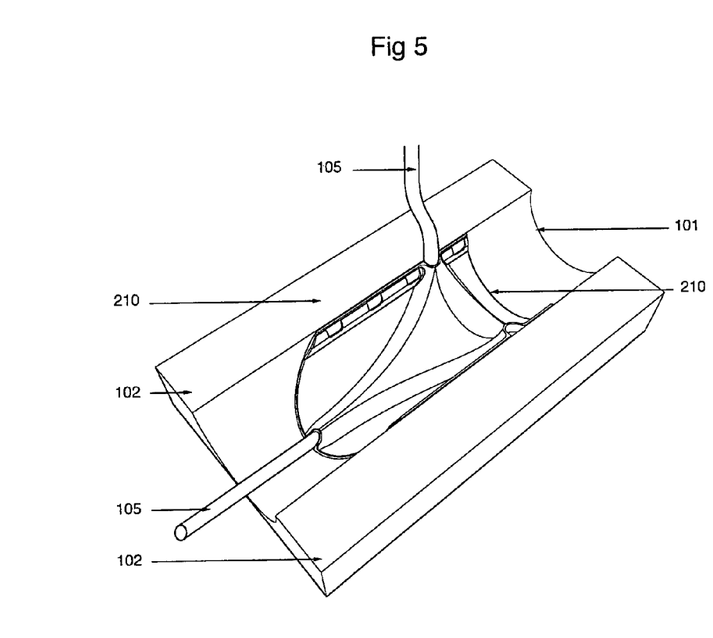
FIG. 5 shows a cable guide according to FIG. 4 installed in the flow channel of a sewer.

A further possible alternative embodiment of a cable guide 210 is shown in FIGS. 4a-4d and fitted in a flow channel 101 in FIG. 5. The cable guide 210 comprises an upper face 220 and a lower face 230. The lower face 230 has a generally convex form so as to lie in contact with the flow channel 101 when fitted in the flow channel 101. The upper face 220 has a generally concave form and is shaped to minimise disturbance of the flow when fitted in the flow channel 101.

A passage is defined between the lower face 230 and the flow channel having an entrance opening 213 at a first end 211 of the cable guide 210 and exit openings 214 on the sides of the cable guide towards a second end 212. The cable guide 210 is secured to the flow channel 101 by means of suitable fixing means (not shown) including but not limited to bolts, screws nails or similar passing through fixing holes 215. Additionally, a suitable adhesive may be applied to the lower surface 230 to increase the security of the fixing.

The cable guide 210 is formed from a rigid plastic material such as polyvinyl chloride, polypropylene or similar. Accordingly, the cable guide 210 is able to resist decomposition by chemical or biological agents likely to be present within the sewer. In alternative embodiments, the cable guide 210 may be formed from any other suitable material such as stainless steel.

The lower surface 230 comprises a recess 232 having a narrow portion 233 culminating in opening 213 at first end 211. The recess has a wider portion 234 towards end 212, which at its widest points includes openings 214. Providing two such openings 214 means one form of cable guide 210 can be used to allow a cable 105 to exit a flow channel 101 on either side, thus simplifying installation and stock management.

The wider portion 234 is further subdivided by a plurality of crossed vanes 235. These vanes 235 help maintain the structural integrity of the recess under vertical loading. A cable can thus be laid along the passageway from opening 213 to either opening 214. The lower face 230 is additionally provided with minor vanes 236 over the parts of the face adapted to contact the flow channel 101. These minor vanes 236 can help the deal with unevenness in the walls of the flow channel 101.

The upper face 220 is provided with a bulge 222 corresponding to the recess 232. As with recess 232, the bulge 222 has a narrow portion 223 culminating in opening 213 at first end 211. The bulge 222 similarly has a wider portion 224 towards end 212, which at its widest points includes openings 214. The bulge 222 has a curved surface shaped to minimise disturbance to the flow when fitted in the flow channel. Similarly, linear bulges 121 are provided around fixing holes 215 to minimise the disturbance to the flow provided by the heads of the fixing means.

The cable guide 210 is installed into the sewer by a process similar to the first embodiment 110 except that the formation of and filling of the grove 103 are not necessarily required since openings 214 extend right to the edge of the sides of the cable guide 210 and thus allow a cable 105 to exit without the provision of a groove 103. As above firstly, it is determined at what location the cable 105 is to enter/exit the flow channel 101. Optionally, a series of receiving holes 104 for receiving fixing means are provided and/or epoxy resin of a type adapted to cure under water is applied to the lower face 130. The cable is then laid in the flow channel 101 exiting at the desired location. The cable guide 210 is then placed in the flow channel 101 such it covers the cable 105, the cable 105 running through the recess 232 from opening 213 to one of the openings 214. In an alternative method, the receiving holes 104 can be formed after the cable guide 210 is located. In a further alternative embodiment, the cable guide 210 is installed in position before a cable 105 can be passed through the passage between openings 213 and 214.

Such a cable guide 210 has similar advantages to the first cable guide embodiment 110 in minimising disruption to the flow, restricting the lateral movement of the cable 105 and convenience of fitting and replacing a cable. The second embodiment 210 may indeed be marginally quicker to fit initially as it does not require the creation and filling of a groove 103. Accordingly, this cable guide 210 and method may be applied to constructing networks, such as data networks, by laying cables through sewers.

Figure 6A:
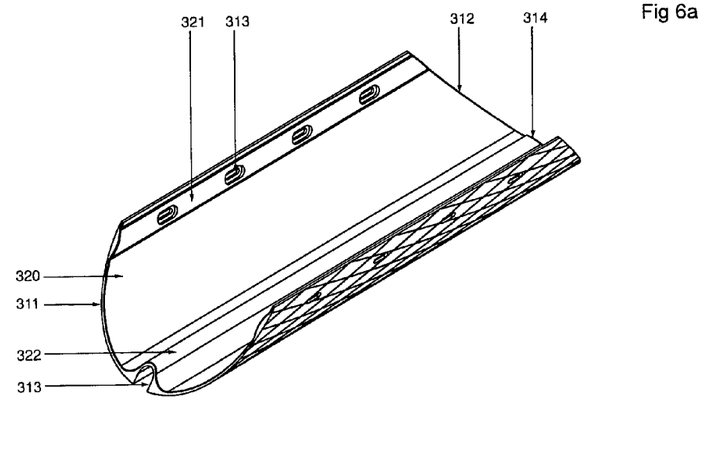
FIG. 6a shows a perspective view of a third embodiment of a cable guide according to the present invention.
Figure 6B:
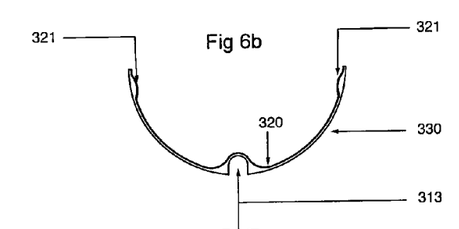
Figure 6C:
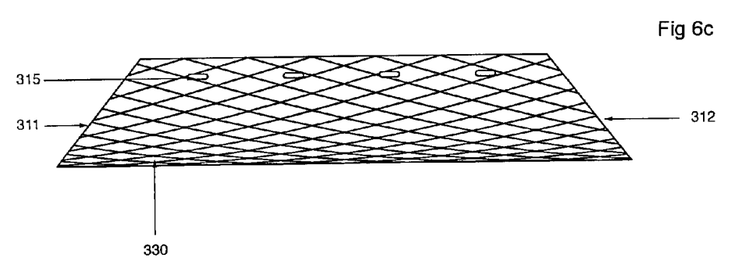
Figure 6D:
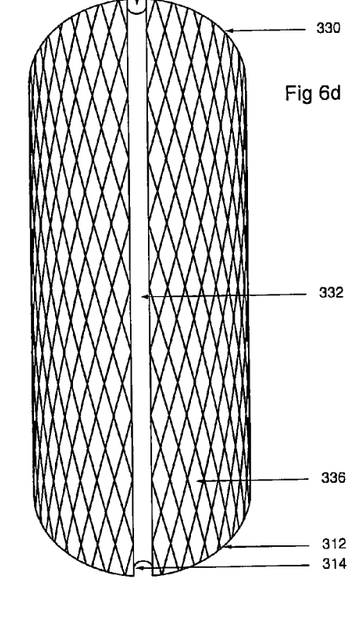
Figure 7:
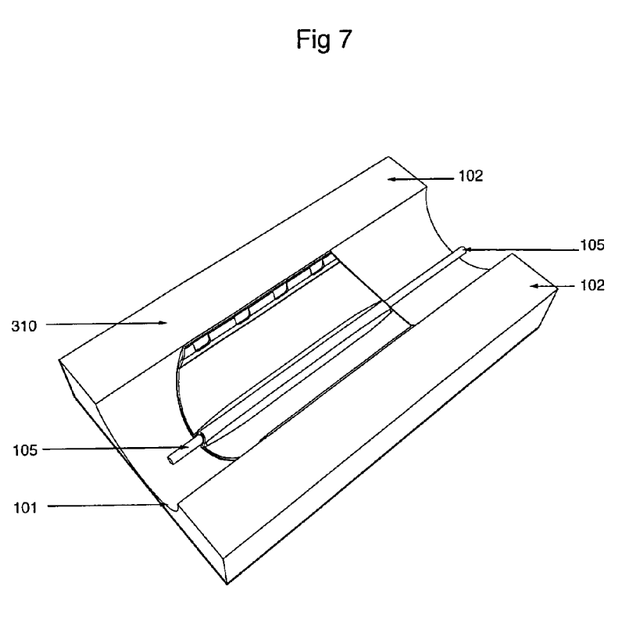
FIG. 7 shows a cable guide according to FIG. 6 installed in the flow channel of a sewer.

A further possible alternative embodiment of a cable guide 310 is shown in FIGS. 6a-6d and fitted in a flow channel 101 in FIG. 7. The cable guide 310 of this embodiment is adapted merely to retain the cable 105 in the flow channel 101 rather than allow the cable 105 to exit the flow channel 101. The cable guide 310 comprises an upper face 320 and a lower face 330. The lower face 330 has a generally convex form so as to lie in contact with the flow channel 101 when fitted in the flow channel 101. The upper face 320 has a generally concave form and is shaped to minimise disturbance of the flow when fitted in the flow channel 101.

A passage is defined between the lower face 330 and the flow channel having an entrance opening 313 at a first end 311 of the cable guide 310 and exit opening 314 at a second end 312. The cable guide 310 is secured to the flow channel 101 by means of suitable fixing means (not shown) including but not limited to bolts, screws nails or similar passing through fixing holes 315. Additionally, a suitable adhesive may be applied to the lower surface 330 to increase the security of the fixing.

The cable guide 310 is formed from a rigid plastic material such as polyvinyl chloride, polypropylene or similar. Accordingly, the cable guide 310 is able to resist decomposition by chemical or biological agents likely to be present within the sewer. In alternative embodiments, the cable guide 310 may be formed from any other suitable material such as stainless steel.

The lower surface 330 comprises a recess 332 being in the form of a narrow channel 333 between opening 313 at first end 311 and opening 314 at second end 312. A cable 105 can thus be laid along the passageway from opening 313 to opening 314. The lower face 330 is additionally provided with minor vanes 336 over the parts of the face adapted to contact the flow channel 101. These minor vanes 336 can help the deal with unevenness in the walls of the flow channel 101.

The upper face 320 is provided with a bulge 322 corresponding to the recess 332. As with recess 332, the bulge 322 has a linear form between opening 313 at first end 311 and opening 314 at second end 312. The bulge 322 has a curved surface shaped to minimise disturbance to the flow when fitted in the flow channel. Similarly, linear bulges 321 are provided around fixing holes 315 to minimise the disturbance to the flow provided by the heads of the fixing means.

The cable guide 310 is installed into the sewer by the same process as the second embodiment 210. As the cable guide 310 is provided to restricting the lateral movement of the cable 105 and retain it within the flow channel 101, such guides 310 may be fitted at regular intervals along a cable 105. As above firstly, it is determined at what location the cable guide 310 is to be fitted. Optionally, a series of holes 104 for receiving fixing means are provided and/or epoxy resin of a type adapted to cure under water is applied to the lower face 330. The cable is then laid in the flow channel 101. The cable guide 310 is then placed in the flow channel 101 such it covers the cable 105, the cable 105 running through the recess 332 from opening 313 to opening 314. In an alternative method, the fixing holes 104 can be formed after the cable guide 310 is located. In a further alternative embodiment, the cable guide 310 is installed in position before a cable 105 is passed through the passage between openings 313 and 314.

Such a cable guide 310 minimises disruption to the flow, restricts the lateral movement of the cable 105 is convenient both for fitting and replacing a cable 105. Accordingly, this cable guide 310 and method may be applied to constructing networks, such as data networks, by laying cables through sewers.

Figure 10A:
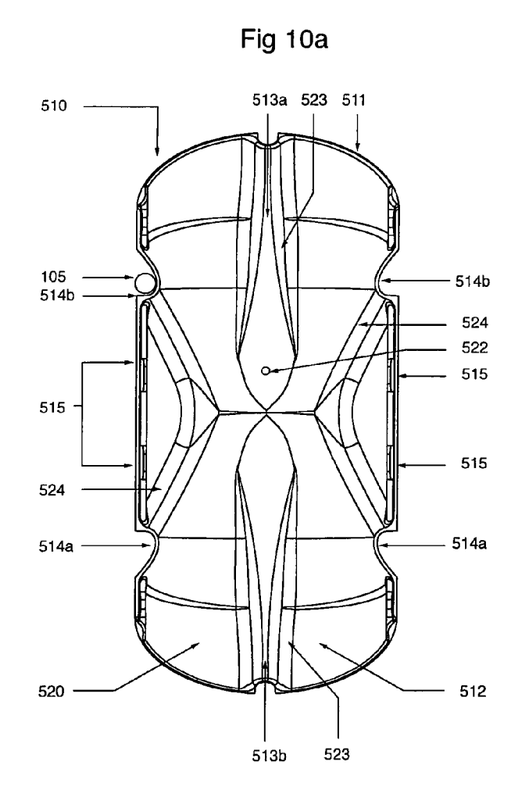
FIG. 10a shows a plan view of a further embodiment of a cable guide according to the present invention.
Figure 10B:
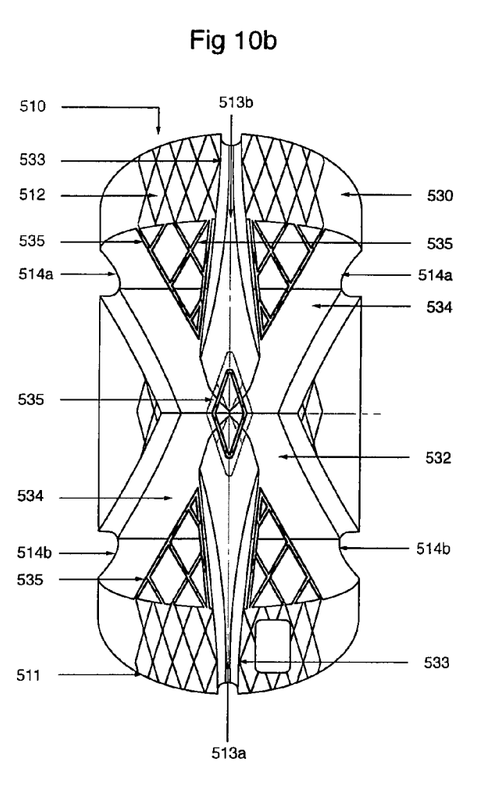

A further possible alternative embodiment of a cable guide 510 is shown in FIGS. 10a-10b. The cable guide 510 comprises an upper face 520 and a lower face 530. The lower face 530 has a generally convex form so as to lie in contact with the flow channel 101 when fitted in the flow channel 101. The upper face 520 has a generally concave form and is shaped to minimise disturbance of the flow when fitted in the flow channel 101.

A plurality of alternative passages is defined between the lower face 530 and the flow channel. The passages have an entrance/exit opening 513a at a first end 511 of the cable guide 510 and exit/entrance openings 514a on the sides of the cable guide towards a second end 512. The passages further have an entrance/exit opening 513b at the second end 512 of the cable guide 510 and exit/entrance openings 514b on the sides of the cable guide towards the first end 512. The cable guide 510 is secured to the flow channel 101 by means of suitable fixing means (not shown) including but not limited to bolts, screws nails or similar passing through fixing holes 515. Additionally, a suitable adhesive may be applied to the lower surface 530 to increase the security of the fixing.

The cable guide 510 is formed from a rigid plastic material such as polyvinyl chloride, polypropylene or similar. Accordingly, the cable guide 510 is able to resist decomposition by chemical or biological agents likely to be present within the sewer. In alternative embodiments, the cable guide 510 may be formed from any other suitable material such as stainless steel.

The lower surface 530 comprises a recess 532 having a narrow portion 533 culminating in opening 513a, 513b at each end 511, 512. The recess has a wider portion 534 towards each end 511, 512, which at its widest points includes openings 514a, 514b. Providing four side exit/entrances 514a, 514b and two end entrances/exits 513a, 513b means one form of cable guide 510 can be used to allow a cable 105 to exit a flow channel 101 on either side or be retained within the flow channel, thus simplifying installation and stock management.

The wider portion 534 is further subdivided by a plurality of crossed vanes 535. These vanes 535 help maintain the structural integrity of the recess under vertical loading. A cable can thus be laid along the passageway from openings 513a, 513b to any of opening 514a, 514b or the other openings 513a, 513b. Similarly, a cable can be laid along the passageway from openings 514a, 514b to any of the other openings 514a, 514b. The lower face 230 is additionally provided with minor vanes 536 over the parts of the face adapted to contact the flow channel 101. These minor vanes 536 can help the deal with unevenness in the walls of the flow channel 101.

The upper face 520 is provided with a bulge 522 corresponding to the recess 232. As with recess 532, the bulge 522 has a narrow portion 523 culminating in opening 513 at each end 511, 512. The bulge 522 similarly has wider portions 524 towards each end 511, 512, which at its widest points includes openings 514a, 514b. The bulge 522 has a curved surface shaped to minimise disturbance to the flow when fitted in the flow channel.

Figure 8A:
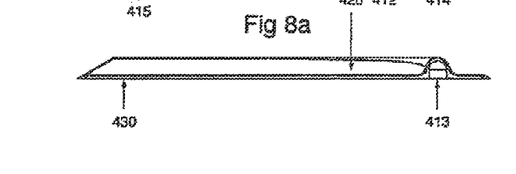
FIG. 8a shows an end view of a fourth embodiment of a cable guide according to the present invention.
Figure 8C:
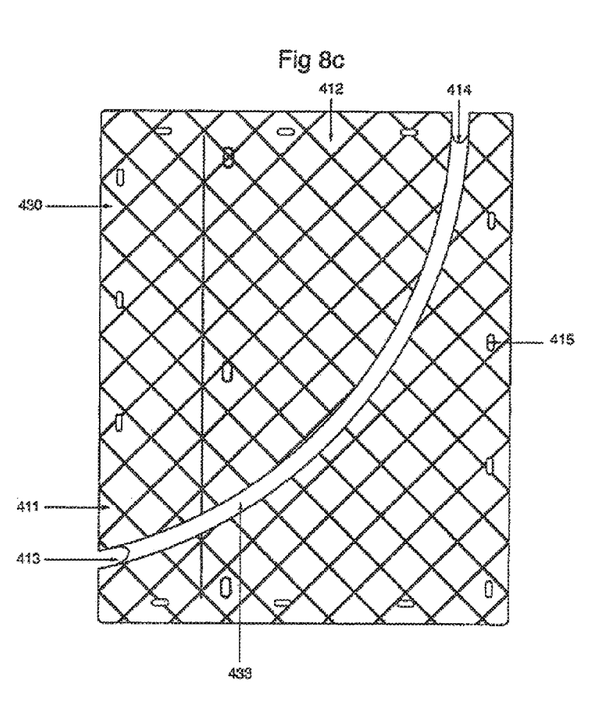

The cable guide 510 is installed into the sewer by the process described in respect of cable guides 210 or 310 above. Such a cable guide 510 minimises disruption to the flow, restricts the lateral movement of the cable 105 and is convenient both for fitting and replacing a cable 105. Furthermore, the cable guide 510 can be used to fit cables travelling along, into out of or traversing a flow channel 101 as required. As such a fitter may use cable guide 510 as an alternative to either cable guide 210 or cable guide 310 as desired or as required. Accordingly, this cable guide 510 and method may be applied to constructing networks, such as data networks, by laying cables through sewers A further possible alternative embodiment of a cable guide 410 is shown in FIGS. 8a-8c. The cable guide 410 of this embodiment is adapted to retain the cable 105 in position when crossing the banks (or overflow portion) 102 adjoining the flow channel 101. The cable guide 410 comprises an upper face 420 and a lower face 430. The lower face 430 is generally flat as is the upper face 420.

Figure 8D:
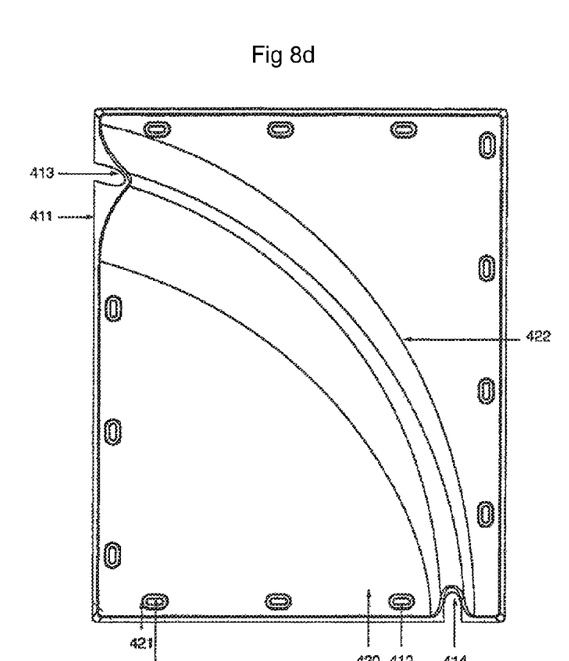

A passage is defined between the lower face 430 and the overflow portion 102 having an entrance opening 413 at a first end 411 of the cable guide 410 and exit opening 414 at a second end 412. The cable guide 410 is secured to the overflow portion 102 by means of suitable fixing means (not shown) including but not limited to bolts, screws nails or similar passing through fixing holes 415. Additionally, a suitable adhesive may be applied to the lower surface 430 to increase the security of the fixing.

The cable guide 410 is formed from a rigid plastic material such as polyvinyl chloride, polypropylene or similar. Accordingly, the cable guide 410 is able to resist decomposition by chemical or biological agents likely to be present within the sewer. In alternative embodiments, the cable guide 410 may be formed from any other suitable material such as stainless steel.

The lower surface 430 comprises a recess 432 being in the form of a narrow curved channel 433 between opening 413 at first end 411 and opening 414 at second end 412. A cable 105 can thus be laid along the passageway from opening 413 to opening 414. The lower face 430 is additionally provided with minor vanes 436 over the parts of the face adapted to contact the overflow portion 102. These minor vanes 336 can help the deal with unevenness in the walls of the overflow portion 102.

The upper face 420 is provided with a bulge 422 corresponding to the recess 432. As with recess 432, the bulge 422 has a curvilinear form between opening 413 at first end 411 and opening 414 at second end 412. The bulge 422 has a curved surface shaped to minimise disturbance to the flow when fitted in the overflow portion 102. As can be seen part of this shaping includes a gradual increase in the width of the bulge 422 between 413 and 414. Similarly, circumferential bulges 421 are provided around fixing holes 415 to minimise the disturbance to the flow provided by the heads of the fixing means.

The cable guide 410 is installed into the sewer by a similar process to the third embodiment 310. As the cable guide 410 is provided for securing the cable 105 on the overflow portion, it is typically fitted at bends or junctions in the sewer. As above firstly, it is determined at what location the cable guide 410 is to be fitted. Optionally, a series of receiving holes 104 for receiving fixing means are provided and/or epoxy resin of a type adapted to cure under water is applied to the lower face 430. The cable is then laid over the overflow portion 102. The cable guide 410 is then placed on the overflow portion 102 such it covers the cable 105, the cable 105 running through the recess 432 from opening 413 to opening 414. In an alternative method, the receiving holes 104 can be formed after the cable guide 410 is located. In a further alternative embodiment, the cable guide 410 is installed in position before a cable 105 is passed through the passage between openings 413 and 414.

Such a cable guide 410 minimises disruption to the flow, restricts the lateral movement of the cable 105 and is convenient both for fitting and replacing a cable 105. Accordingly, this cable guide 410 and method may be applied to constructing networks, such as data networks, by laying cables through sewers.

Figure 11A:
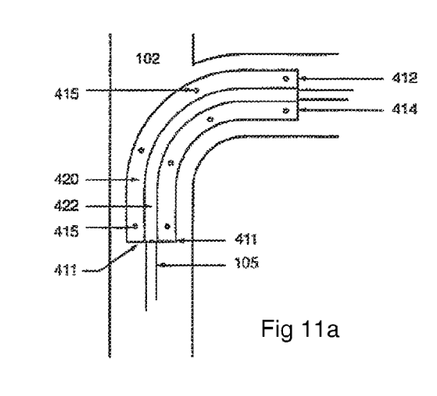
FIG. 11a shows an alternative form of a fourth embodiment of a cable guide according to the present invention.
Figures 11B, 11C:
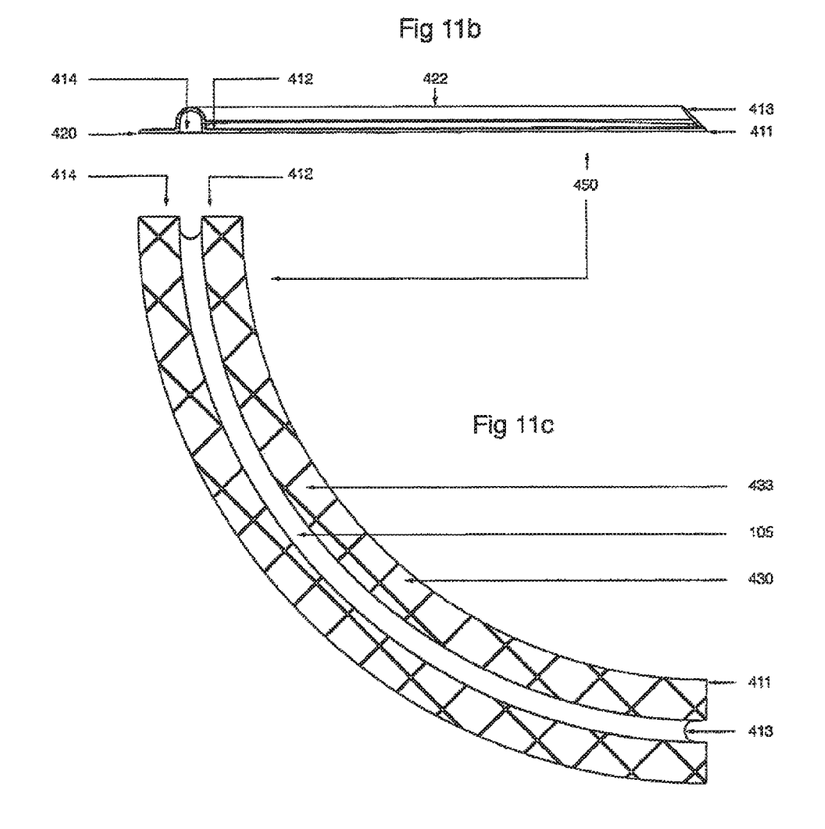

In cases where space is limited, an alternative corner cable guide 450 may be used; such a guide is illustrated in FIGS. 11a-11c. Such spaces may be at the junction of two relatively narrow sewer sections (say ~150 mm diameter) or at the junction of one such narrower sewer with a larger sewer.

The cable guide 450 of this embodiment is adapted to retain the cable 105 in position when crossing the banks (or overflow portion) 102 adjoining the flow channel 101 or when crossing a junction of two relatively narrow sewers. The cable guide 450 differs from cable guide 410 in having a much reduced upper surface 420 and a much narrower bulge 422. The fixture holes 415 are also consequently reduced in size.

Figure 11D:
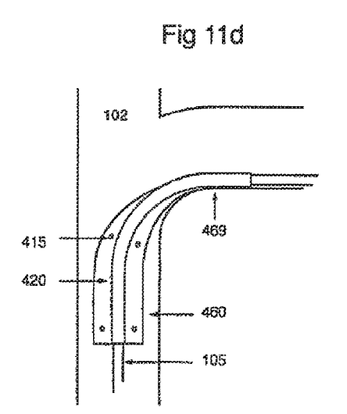
FIG. 11d shows a further alternative form of a fourth embodiment of a cable guide according to the present invention.
Figure 12A:
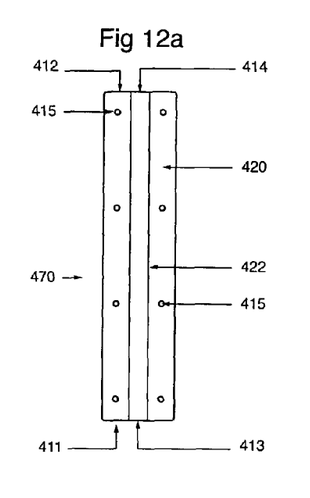
FIG. 12a shows a still further alternative form of a fourth embodiment of a cable guide according to the present invention.
Figures 12B, 12D:
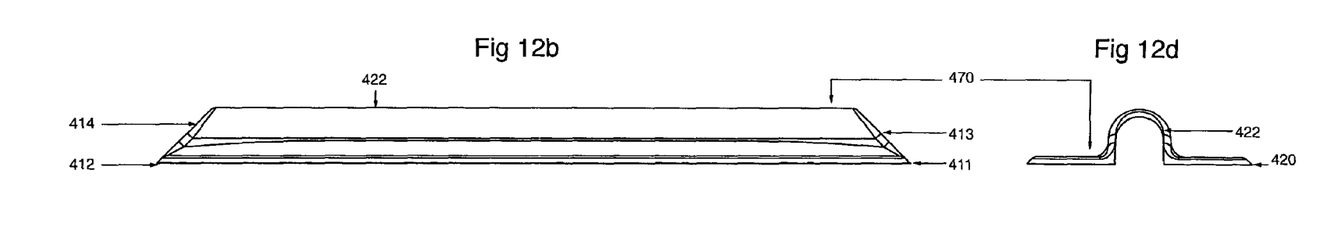
Figure 12C:
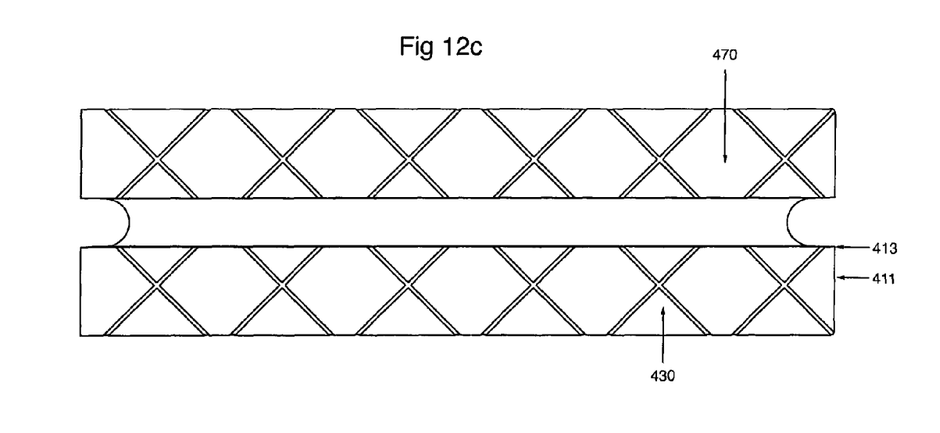

An alternative embodiment of such cable guide 460 with a tapered end 469 is shown in FIG. 11d. Apart from the tapered end 469 the cable guide 460 is substantially the same as the cable guide 450.

It is also possible to provide a straight cable guide 470, which differs from cable guide 450 only in being straight rather than curved, as is shown in FIGS. 12a-d. Such a guide is adapted to use on straight sections of overflow portion 102 or in relatively narrow sewers.

Figure 9:
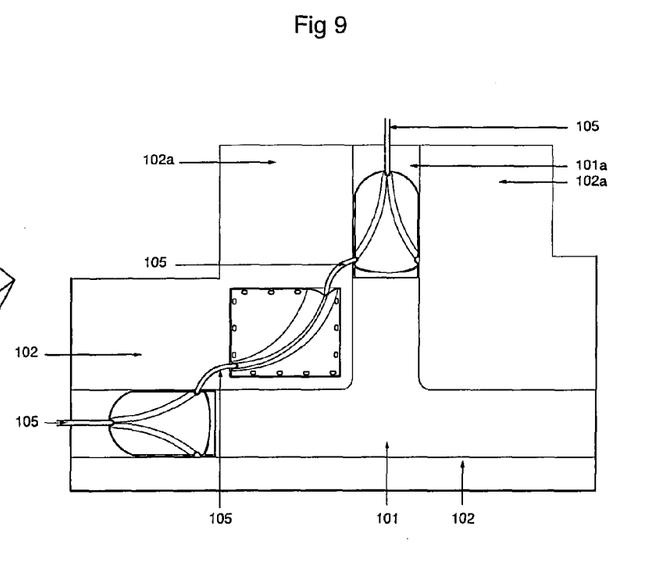
FIG. 9 shows how two cable guides according to FIG. 2 or 4 may be used in conjunction with a cable guide according to FIG. 8 to guide a cable around a junction in a sewer.

Turning now to FIG. 9, this illustrates the use of a cable guide 410 in conjunction with two cable guides 210 to guide a cable 105 out of a first flow channel 101 and into a second flow channel 101a without lying across the direction of flow at the junction of the two flow channels 101, 101a. In this example, a cable guide 110 such as those shown in FIGS. 2a-2d may be used in place of the cable guide 210, as desired or as appropriate.

In the example shown, the cable 105 is secured on the overflow portion 102, 102a by a cable guide 410 at a T junction. These methods can however be applied to other junctions, bends or similar within the sewer 101. In some sewers, a bypass tube or duct is provided which enables a tube to bypass a junction, bend or similar. Where such bypass tubes are provided, the cable may exit the flow channel using a cable guide 210 pass through the bypass tube before re-enter the flow channel via a second cable guide 210.

Another example of a position wherein the cable guide 210 (or cable guide 110) may be used is in allowing the cable 105 to exit the flow channel 101 at points wherein the cable 105 is to exit the sewer 100 altogether. At such points, the cable 105 may be pinned along the sewer wall between the overflow portion 102 and an exit duct. The exit duct may allow the cable 105 to enter its final destination (such as a building), connect to another cable, enter another sewer or other such conduit. In this manner, the cable 105 may be connected to one or more other cables or nodes to provide a network.

In order to prevent the escape of noxious or unpleasant gases from the sewer, the duct may be sealed around the cable. This may be achieved by applying a suitable filler material or adhesive around the cable 105. Alternatively, this may be achieved by providing a suitable sealing means. The sealing means may be bung adapted to fit said duct and provide a substantially airtight passage through which said cable 105 may pass.

It is of course to be understood that the invention is not to be restricted to the details of the above embodiments which have been described by way of example only.

The invention claimed is:

1. A cable guide, suitable for use in a flow channel of a sewer without substantially impeding a flow therein, the cable guide comprising:
    an upper face that provides a boundary to the flow channel and is shaped to minimize disturbance of the flow; and
    a lower face adapted to lie in contact with walls of the flow channel wherein the lower face is generally downwardly convex;
    one or more substantially contiguous recesses defined on the lower face, with each recess being generally upwardly concave, each recess having at least one vane to subdivide the respective recess;
    one or more minor vanes projecting downwardly from a surface of the lower face;
    the cable guide being configured so that when the lower face lies in contact with the walls of the flow channel the walls of the flow channel and the one or more substantially contiguous recesses are in spaced apart relation so they together define therebetween one or more passageways suitable for carrying a cable from one edge of the cable guide to another edge,
    wherein contact between the lower face and the walls of the flow channel is made by a respective lower end of the one or more downwardly projecting minor vanes.

2. The cable guide as claimed in claim 1 wherein in order for the lower face to lie substantially flush with the walls of the flow channel, it is shaped to correspond with the walls of the flow channel.

3. The cable guide as claimed in claim 1 wherein the lower face is shaped so as to lie within a recess provided in the walls of the flow channel.

4. The cable guide as claimed in claim 1 wherein the contact between the lower face and the walls of the flow channel is by way of substantially the full surface of the lower face, excluding said recesses.

5. The cable guide as claimed in claim 1 wherein the recesses provide a passageway leading from one edge of the cable guide lying towards the middle of the flow channel to an edge of the cable guide at the edge of or outside the flow channel.

6. The cable guide as claimed in claim 3 wherein the recesses are adapted such to provide a single entrance point at an edge of the cable guide lying towards the middle of the flow channel and two alternative exit points on opposite side edges of the cable guide at the edge of or outside the flow channel.

7. The cable guide as claimed in claim 3 wherein the recesses are adapted such to provide a single entrance point at an edge of the cable guide lying towards the middle of the flow channel and a single exit point at an opposite edge of the cable guide lying towards the middle of the flow channel.

8. The cable guide as claimed in claim 3 wherein the recesses are adapted to provide an entrance or exit point at each edge of the cable guide lying towards the middle of the flow channel and two pairs of alternative exit or entrance points on opposite side edges of the cable guide at the edge of or outside the flow channel.

9. The cable guide as claimed in claim 3 wherein in order to accommodate the recesses in the lower face, corresponding bulges are provided in the upper face.

10. The cable guide as claimed in claim 1 wherein the cable guide is retained in position by use of a suitable adhesive.

11. The cable guide as claimed in claim 1 wherein the cable guide is secured in position by fixing means such as bolts, screws, nails or similar driven into the wall of the flow channel through fixing holes provided in the cable guide.

12. The cable guide as claimed in claim 11 wherein bulges are provided around the fixing holes.

13. The cable guide as claimed in claim 1 wherein the cable is adapted to lie at least partly in a pre-existing or specifically prepared groove in the sewer and the cable guide extends over the groove.

14. The cable guide as claimed in claim 1 wherein the cable guide comprises a panel shaped to conform to the profile of the flow channel section in which the guide is provided.

15. A network comprising:
one or more cables laid along the flow channels of sewers; and
one or more cable guides, each cable guide comprising:
an upper face that provides a boundary to the flow channel and is shaped to minimize disturbance of the flow;
a lower face adapted to lie in contact with the walls of the flow channel section wherein the lower face is generally downwardly convex;
one or more substantially contiguous recesses defined on the lower face, with each recess being generally upwardly concave, and with each recess having at least one vane to subdivide the respective recess;
one or more minor vanes projecting downwardly from a surface of the lower face;
each cable guide being configured so that when the lower face lies in contact with the walls of the flow channel the walls of the flow channel and the one or more substantially contiguous recesses are in spaced apart relation so they together define one or more passageways suitable for carrying a cable from one edge of the cable guide to another edge,
wherein contact between the lower face and the walls of the flow channel is made by a respective lower end of the one or more downwardly projecting minor vanes.

16. The network as claimed in claim 15 wherein said cable guide provides a single entrance point at an edge of the cable guide lying towards the middle of the flow channel and a single exit point at an opposite edge of the cable guide lying towards the middle of the flow channel at regular intervals along the cable lying in the flow channel.

17. The network as claimed in claim 15 wherein said cable guide provides at least a passageway leading from one edge of the cable guide lying towards the middle of the flow channel to an edge of the cable guide at the edge of or outside the flow channel at each point where a cable is required to enter or exit the flow channel of a sewer.

18. The network as claimed in claim 17 wherein the cable guides are provided on either side of bends or junctions in the sewer and at places wherein the cable is to exit the sewer altogether.

19. The network as claimed in claim 18 wherein at such points where the cable exits the flow channel it is secured by means of said cable guide wherein said cable guide has a substantially flat overall form adapted to be provided on the overflow portion.

20. A method of laying a cable network incorporating at least one cable lying in the flow channel of a sewer comprising the steps of:
laying a cable in the flow channel of a sewer;
installing a cable guide comprising an upper face that provides a boundary to the flow channel and is shaped to minimize disturbance of the flow and a lower face adapted to lie in contact with the walls of the flow channel section wherein the lower face is generally downwardly convex, and the lower face is provided with one or more substantially contiguous recesses defined thereon, with each recess being generally upwardly concave, and with each recess having at least one vane to subdivide the respective recess, one or more minor vanes projecting downwardly from a surface of the lower face, the cable guide being configured so that when the lower face lies in contact with the walls of the flow channel the walls of the flow channel and the one or more substantially contiguous recesses are in spaced apart relation so they together define one or more passageways suitable for carrying a cable from one edge of the cable guide to another edge at points wherein the cable is required to be secured or where the cable is required to enter or exit the flow channel; and
passing the cable through the cable guide.

21. A method of installing a cable guide comprising an upper face that provides a boundary to the flow channel and is shaped to minimize disturbance of the flow and a lower face adapted to lie in contact with the walls of the flow channel section wherein the lower face is generally downwardly convex, and the lower face is provided with one or more substantially contiguous recesses defined thereon, with each recess being generally upwardly concave, and with each recess having at least one vane to subdivide the respective recess, one or more minor vanes projecting downwardly from a surface of the lower face, the cable guide being configured so that when the lower face lies in contact with the walls of the flow channel the walls of the flow channel and the one or more substantially contiguous recesses are in spaced apart relation so they together define one or more passageways suitable for carrying a cable from one edge of the cable guide to another edge in a sewer,
the method comprising the steps of:
applying adhesive to the cable guide; and
positioning the cable guide at a desired location in the sewer,
wherein contact between the lower face and the walls of the flow channel is made by a respective lower end of the one or more downwardly projecting minor vanes.

22. The method as claimed in claim 21 wherein the cable guide is fitted in the flow channel of a sewer or is fitted on the overflow portion of the sewer.

23. The method as claimed in claim 21 wherein the method includes the further steps of:
providing a series of receiving holes in the sewer at the desired location; and securing the cable guide by means of fixing means driven into the receiving holes through fixing holes provided in the cable guide.

24. A method of installing a cable guide comprising an upper face that provides a boundary to the flow channel and is shaped to minimize disturbance of the flow and a lower face adapted to lie in contact with the walls of the flow channel section wherein the lower face is generally downwardly convex, and the lower face is provided with one or more substantially contiguous recesses defined thereon, with each recess being generally upwardly concave, and with each recess having at least one vane to subdivide the respective recess, one or more minor vanes projecting downwardly from a surface of the lower face, the cable guide being configured so that when the lower face lies in contact with the walls of the flow channel the walls of the flow channel and the one or more substantially contiguous recesses are in spaced apart relation so they together define one or more passageways suitable for carrying a cable from one edge of the cable guide to another edge in a sewer, the method comprising the steps of:

positioning the cable guide at a desired location in the sewer;

providing a series of receiving holes in the sewer at the desired location;

securing the cable guide by means of fixing means driven into the receiving holes through fixing holes provided in the cable guide,     wherein contact between the lower face and the walls of the flow channel is made by a respective lower end of the one or more downwardly projecting minor vanes.

25. The method as claimed in claim 24 wherein the cable guide is fitted in the flow channel of a sewer or is fitted on the overflow portion of the sewer.

26. The method as claimed in claim 24 wherein the method incorporates the step of providing a groove or recess for the cable.

27. The method as claimed in claim 26 wherein the method comprises the further step of applying filler material over the cable to provide a smooth surface.

28. The method as claimed in claim 21 wherein the method incorporates the steps of providing a groove or recess.

29. The method as claimed in claim 21 wherein the method comprises the further step of applying filler material over the cable to provide a smooth surface.

\* \* \* \* \*